United States Patent [19]

Stannard

[11] Patent Number: 4,845,625
[45] Date of Patent: Jul. 4, 1989

[54] FLIGHT BIDDING SYSTEM OR THE LIKE ESPECIALLY FOR AIRLINE PERSONNEL

[76] Inventor: Louis A. Stannard, 129 Newtown Ave., Norwalk, Conn. 06851

[21] Appl. No.: 44,102

[22] Filed: Apr. 29, 1987

[51] Int. Cl.$^4$ ............................................. G06F 15/26
[52] U.S. Cl. ..................................... 364/407; 364/401
[58] Field of Search ................ 364/402, 407, 401, 403

[56] References Cited

U.S. PATENT DOCUMENTS

| | | | |
|---|---|---|---|
| Re. 31,951 | 7/1985 | Johnson | 364/900 |
| 4,449,186 | 5/1984 | Kelly | 364/407 |
| 4,546,382 | 10/1985 | McKenna | 358/86 X |
| 4,602,279 | 7/1986 | Freeman | 358/86 |
| 4,626,836 | 12/1986 | Curtis | 340/706 |
| 4,745,549 | 5/1988 | Hashimoto | 364/402 |

Primary Examiner—Jerry Smith
Assistant Examiner—Steven Kibby
Attorney, Agent, or Firm—Schweitzer & Cornman

[57] ABSTRACT

A system and procedure is disclosed for evaluating published bid line data of commercial airlines and developing therefrom an ordered set of bid lines arranged according to the degree to which such bid lines tend to satisfy individually expressed preferences and priorities of an airline employee. A system subscriber enters his or her preferences and priorities, according to preestablished defined categories, into a computer database, preferably inputting the information through key entries on a touch tone telephone. Subsequently, when monthly bid lines are published by the employer airline, the various bid lines are computer analyzed, one by one, against the subscriber's recorded preferences and priorities, evaluating such data as credit hours, layovers, arrivals and departures, trips, days off, etc. The output of the syste is an ordered list of flight numbers, specific to a given subscriber, arranged in order of tendency to satisfy the subscriber's expressed preferences and priorities. This may be a printed record, an electronic transmission or the like. The procedures utilized are readily applicable to so-called open time bidding, as well as to bid swapping. Many of the techniques of the invention are applicable as well to other selection procedures in which selections are based upon pre-established preferences.

16 Claims, 4 Drawing Sheets

FLIGHT BIDDING SYSTEM OR THE LIKE ESPECIALLY FOR AIRLINE PERSONNEL

BACKGROUND AND SUMMARY OF THE INVENTION

Historically, flight assignments by major commercial airlines have been made on the basis of a bidding procedure. Typically, this has been done on a monthly basis. This bidding process involves the publication by the airline of various "bid lines" typically consisting of a sequence of flights to various destinations, the necessary airport layovers, etc. The information related to such bid lines typically includes such additional information as pay credit hours, flight times, airport arrival and departure times, etc. A month's scheduling for a major commercial airline may involve hundreds of such bid lines, constituting the entire flight program for the month for that airline.

In the bidding process, the various flight personnel, pilots, co-pilots, engineers, flight attendants etc. submit bids for selected bid lines of their choice. The flight assignments are then made by the airline on a seniority basis, with flight personnel of greatest seniority receiving first preference in the bidding process.

Particularly for flight personnel of lower seniority, desired bid lines may not be available because of previous assignment to personnel of higher seniority status. Accordingly, it is customary to submit numerous bid line selections, so that if primary selections are not available, secondary selections can be assigned.

As can be readily appreciated, the analysis of hundreds of bid lines can be an extraordinarily tedious and time consuming task, because of the wealth of information contained in the bid line publication, and the numerous combinations and permutations of the relevant data.

The present invention is directed to a novel system and procedure for effecting computer analysis of bid line publications and, based upon previously submitted selections of flight criteria, prioritized according to individual flight personnel preferences. The system and procedure issues, as its output, a customized, prioritized list of bid line selections tailored specifically to the indicated desires of a flight employee. This output may be utilized by the employee to make final bid selections, or may itself constitute the bid submission, if desired.

A significant aspect of the procedure of the invention is the establishment of an employee data record, for each subscribing employee, indicating the subscriber's preferences with respect to each of several predefined bid selection criteria, and the order of importance, to that individual subscriber, of such individual bid selection criteria. These preferences and priorities may be routinely changed by the subscriber. In addition, the subscriber may maintain on file, in the computer data bank, a default record of preferences and priorities, which may be utilized for any period in which the subscriber does not submit updated selections.

Pursuant to the invention, upon publication of the bid line selections by an airline for a monthly or other period observed by the airline, each of the bid lines is subjected to computer analysis against each of the preferences and priorities currently on record for a given employee. As part of the analysis, when a particular bid line is found to satisfy a criteria selection made by an employee, a selection value is assigned to that bid line, and that value is in turn adjusted by a priority factor indicated by the employee's flight selection criteria. In this way, a bid line meeting a first priority selection of the employee is assigned a greater value than one meeting a lower priority preference. A single bid line, moreover, may satisfy more than one of the indicated preferences, and the cumulative selection value for such bid line is thus increased by the adjusted or weighted value of the additional preference(s) met by the bid line.

Pursuant to the system of the invention, each and every published bid line is subjected to such analysis, for each subscribing employee. For each such subscriber, the published bid lines, as analyzed and evaluated, are sorted according to the total values assigned thereto representing adjusted or weighted subscriber preferences met by such a bid line. An output is thereupon generated, which consists of a predetermined number of recommended bids, with the first such recommended bid representing a bid line incorporating the maximum preference selections of the employee adjusted in each case for the priority indicated by the subscriber. This output can be in the form of a printed card, an electronic transmission to the airline or the like.

In one of its most advantageous forms, the procedure of the invention is adapted to accept input from individual employee subscribers via touch tone telephone. For touch tone data input, the system is constructed to provide a computer-generated voice response to the touch tone input, so that the accuracy of the data input is immediately confirmed to the user by voice response. The voice response may be in the form of simply repeating the numerals tapped in by the subscriber on the touch tone device, or, in a more comprehensive system, issuing a voice message constituting the effect of the coded information input by touch tone.

Additionally, the process of the invention is equally adaptable to the inputting of subscriber selection information via a standard home personal computer or by a simple, low cost "dumb" terminal, which the subscriber may obtain. For personal computer or dumb terminal input, it may be advantageous to utilize a commercial database service such as Compuserve or The Source to provide a convenient interface between the employee terminal and the data processing terminal. The use of a computer terminal by the subscriber admits of visual observation of data entry and visual response by the host computer, as will be understood, but is otherwise substantively the same as the coded input from the touch tone telephone.

The process and system of the invention result in enormous time savings to the individual airline employees using the system. In addition, because the computer of course has the ability to fully analyze each of the hundreds of published bid lines against each of the subscriber's selection criteria, the bid line selections outputted from the system likely will better reflect the employee's real preferences, than would a manual selection process.

For a more complete understanding of the above and other features and advantages of the invention, reference should be made to the following detailed description of a preferred embodiment of the invention, and to the accompanying drawing.

DESCRIPTION OF PREFERRED EMBODIMENTS

The system of the invention is based upon the significant concept of establishing, for each subscriber, a data record setting forth not only the subscriber's preferences, but the priorities in which such preference should be considered. Importantly, the priorities are not necessarily rigid, but are merely weighted in the analysis of bid line suitability. In accordance with the invention, subscriber preference inputs are based upon an analysis and distillation of the various factors that historically have entered into bid line selections. These of course are subject to expansion, contraction, or adjustment, to suit changing needs. For purposes of illustration, a representative, commercially operative system according to the invention may utilize selected basic categories of subscriber preference. Each such basic preference category may carry several options for expression of choice, generally as set forth in the following chart:

CATEGORY 1: PAY CREDIT HOURS
  Options: Max / Min / Specific Range / Carry Forward Criteria /
CATEGORY 2: DAYS OFF
  Options: Max / Min / Max Off In A Row / Specific Range / Repeating Days Off / Max Total Days Off / Max Occurrence on "n" Days Off /
CATEGORY 3: LAYOVERS
  Options: Mat time at Designated Terminal / Max Occurrence at Des. Term. / Min Time at Des. Term. / No Layover at Des. Term. / Any Layover at Des. Term. /
CATEGORY 4: TRIPS TO AIRPORT
  Options: Max / Min / Specific Range /
CATEGORY 5: PRODUCTIVITY
  Options: Max / Min /
CATEGORY 6: AIRPORT ARRIVALS/DEPARTURES AND TIMES
  Options: Exclude or Require Specific Terminals for Either Arrival or Departure. Exclude or Require Arrivals or Departures only between Selected Times.

The system and procedure of the invention enable a subscriber to express specific choices in each of the above categories and sub-categories and to indicate which has priority over the other (e.g., "Pay Credit" may be more important than "Layovers" to one individual but not to another).

Figure 1:
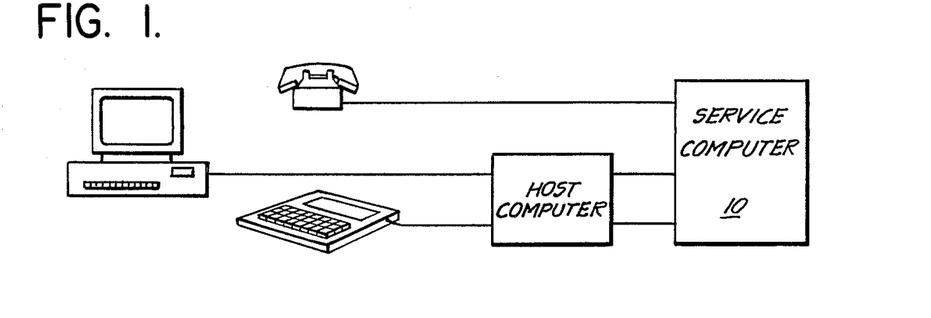
FIG. 1 is a highly schematic illustration of basic elements of the system of the invention.

With reference now to FIG. 1 of the drawing, the reference numeral 10 designates in a general way the primary computer unit for receiving and processing data according to the teachings of the invention. Inputs to the base computer are in the form of subscriber preference inputs, on the one hand, and airline bid line data, on the other. Bid line data is input to the base computer 10 either by direct download from the airline computer system, or by manual input of the data from published bid line material. In either case, the bid line information is processed, in a manner hereinafter to be described, so that the information contained therein is more readily useable for the purposes of the invention. In the usual case, the bid line data is made available by the airlines approximately once per month, and is immediately entered into the base computer 10 and processed for compatibility.

One of the primary means for inputting subscriber preference data is a conventional touch tone telephone which, through conventional modem and terminal software facilities at the primary computer, can be connected to the computer for direct entry of data through touch tone signals. For this purpose, the base computer 10 advantageously includes a conversion device, such as a Dialogic Corp D-40 board for conversion of the touch tone sound inputs into coded digital outputs readable by the computer 10.

While the touch tone telephone may be a highly suitable device for subscriber preference input, because of its universal availability almost anywhere in the world, the invention also contemplates other means of input, such as a conventional household PC or perhaps even a low cost "dumb" terminal having little more than a keyboard, a built in modem and perhaps sufficient local intelligence to provide for automatic dialing and logon. For data input from a PC or dumb terminal, it is contemplated that the operative algorithms will be furnished to a service organization, such as Compuserve, The Source or the like which will provide a host computer for dialog with subscribers entering data from a remote terminal. Periodically (i.e., once per day), the subscriber data inputs to the service organization are downloaded to the base computer 10 for final processing.

Figure 2A:
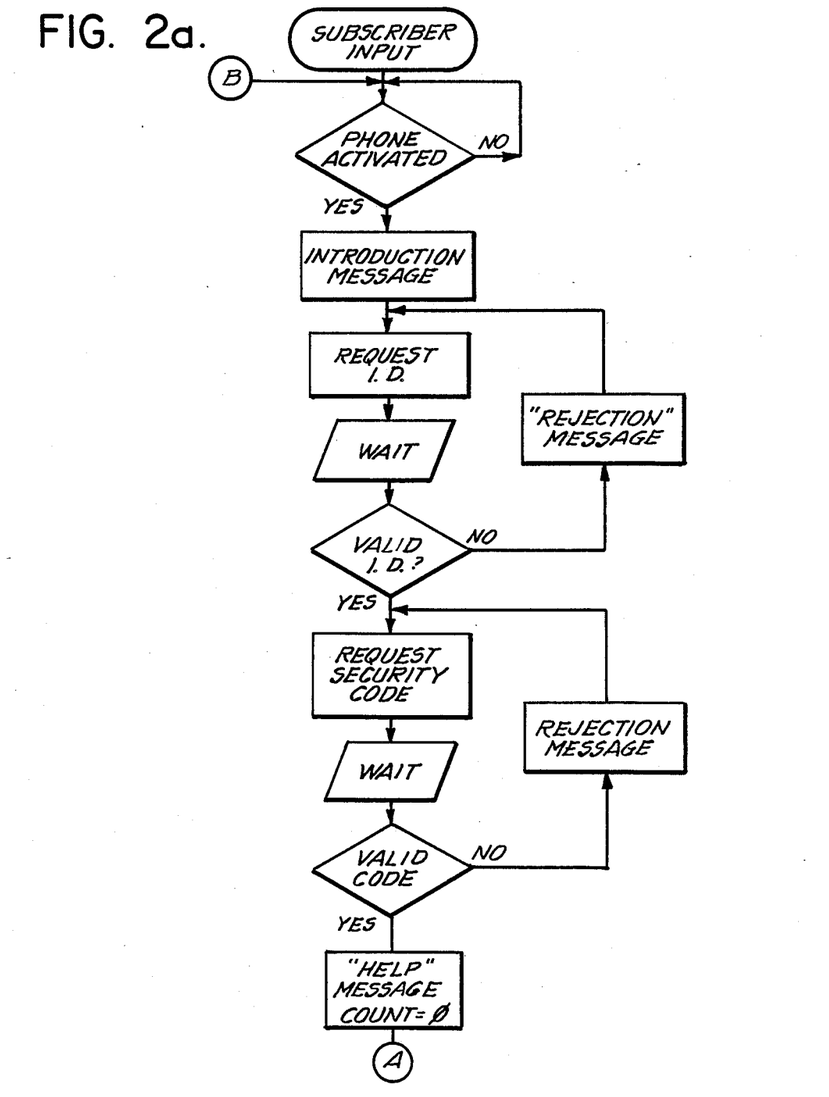
FIGS. 2a and 2b, together, constitute a highly schematic flow diagram of subscriber data entry routines utilized in the computerized bidding system of the invention, particularly with reference to input by touch tone telephone.
Figure 2B:
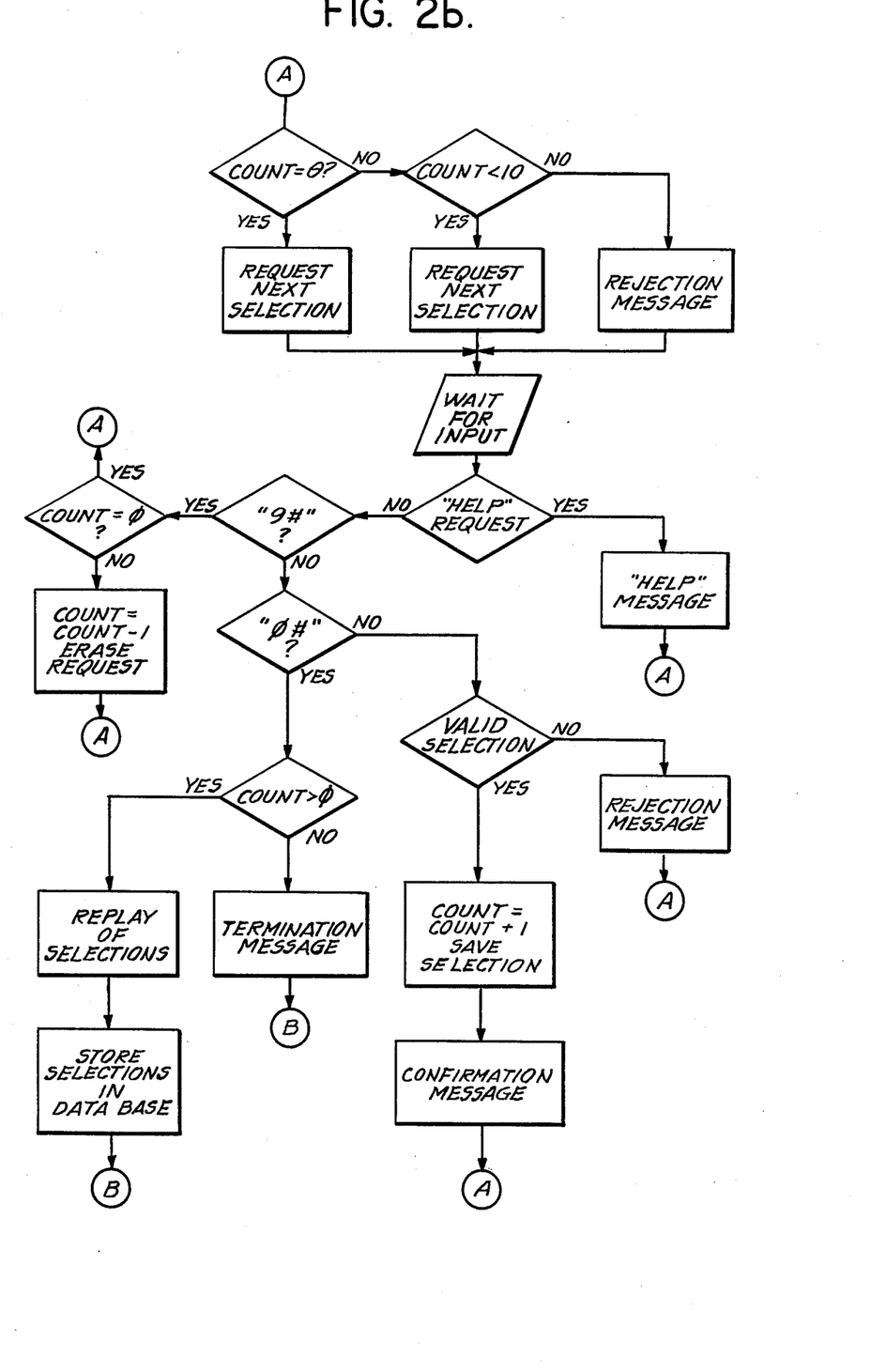

It will be assumed herein that subscriber preference data is being input by a touch tone phone according to the routines of FIGS. 2a and 2b. With reference initially to the flow diagram of FIG. 2a, the system in the ready state is constantly testing for the input of a telephone ring. When a ring is received and detected, the system answers with an introductory message and prompts the subscriber for entry of preliminary information, such as user class and employee number. This is accomplished by tapping the appropriate touch tone keys. "User Class" indicates the type of employee and the particular airline. For example, the user class "100", entered by tapping (1) (0) (0) on the touch tone, may signify American Airlines pilots, "200" American Airlines flight attendants, "300" PanAm pilots, etc. The end of this (or any other) data entry sequence is signified by the subscriber, by tapping the (#) key. After the (#) signal is received, the system advantageously plays back a recorded message verbally repeating the subscriber's touch tone entries. In the case of the preliminary information, the input information is then checked against a file of current subscribers, to verify the validity of the identification. If the entry is not valid, a rejection message is played back to the subscriber, followed by a renewed request for entry of user class and employee number.

Once the subscriber's user class and employee number is validated, a verbal message is played requesting entry of the subscriber's security code. This code, as all other data entries via the touch tone system, is entered by tapping of appropriate keys, terminated by tapping of the (#) key. This entry is checked for validity against a file of current subscribers. When the security code has been validated, a further introductory message is played to the subscriber, reminding of the touch tone codes to be entered when seeking instructions (for example, entry of the (*) (#) sequence causes help messages to be played). The selection count for the subscriber set is initialized at zero, and the processing proceeds to the entry of the subscriber preference entry loop "A", at the upper left in the flow diagram of FIG. 2b.

In the subscriber preference entry loop, the selection count number is checked. If it is zero, a recording is played requesting the subscriber to enter the first selection. After the input has been completed it is examined to determine if it is a "help" request (signified by entry of the (*) (#) keys). If so, the help message is played, and the system recycles to the beginning of the selection loop. If the entry is not a help request, it is tested for a cancellation request (signified by the entry of (9) (#)keys). If the entry is a cancellation request, then, if the selection count is greater than zero, it is decremented by one, the selection is erased, and the system returns to the beginning of the selection loop.

If the entry is not a cancellation request, it is tested to ascertain if it is a termination request (signified by entry of the (0) (#) keys. If it is determined to be a termination entry, the selection count is checked. If no selections have been entered, a signoff message is played to the subscriber, and the system returns to the "waiting" status, as at the entry point "B" of the FIG. 2a flow diagram. If valid selections have been made, a replay of the selections may be made, if desired, and the selections are recorded to disc and thus stored in the database. This system then returns to the waiting status.

After testing for "help", "cancellation" and "termination" requests, with negative results, the system examines the entered data for validity. If it is not a valid selection, a rejection message is played and the system returns to the beginning of the selection loop. If the selection is valid, the selection count is incremented, and the selection is saved in a data array. In addition, a playback is made of the subscriber's selection, for confirmation. Typically, this is accomplished by a verbal replay of the numbers tapped in by the subscriber. In a comprehensive system, the playback could as well be the substance of the request. For this purpose, the system may include a randomly accessible database of pre-recorded verbal responses, which are accessed, assembled if necessary, and "played" back to the subscriber.

After playback of the confirmation message, the system recycles to the beginning of the selection loop, and additional selections are requested unless the selection count exceeds the maximum permitted. In the latter case, a message is played to the subscriber, advising that the session should be terminated or the last selection should be cancelled.

As a feature of particular advantage, priority of the preference categories is a factor in the analysis and selection of bid lines. Where desired, priority can be expressed for each category as a keyed-in entry through the touch tone input. However, more simply and more advantageously, priority of preference category is determined by the order of entry by the subscriber. For example, if "productivity" is the subscriber's most important concern, the subscriber enters Category 5 as the first entry of preference data. If "layovers" is the second highest priority of the subscriber, then a Category 3 selection is entered next, and so on. If a given category is evaluated by the subscriber at an equal priority to the previous category (e.g., "layovers" is equally as important as "productivity") the subscriber may key in "(*) (*)" in advance of the category number—"(3)" in the example—to avoid decrementing the priority value for that category.

When the selection data is ultimately processed against the published bid line information, the higher priority selections are given greater weight, than lower priority selections. That is, a bid line meeting the preference criteria of the subscriber with respect to "productivity" would be selected before a bid line equally meeting the subscriber preferences with respect to "layovers".

Typical touch tone data entry for the system of the invention is as follows: The first number entered for any selection represents the category. Ten categories can be accommodated with single digit entry, although only six primary preference categories are included in the present illustration.

In Category 1 ("Credit Hours and Carry Overs") can be selected in the following manner: (9) (9) indicates max. pay credit; (1) (1) indicates min. pay credit; (L) (L) (H) (H) selects a range of credit hours between and indicated low and an indicated high; (0) (0) (*) requires no carry forward into the following month; (1) (1) (*) specifies minimum carry overs, (5) (5) (*) specifies any carry overs; (9) (9) (*) requests max. carry overs.

In Category 2 ("Days Off"), (9) (9) selects max. total days; (8) (8) selects max. block of consecutive days off; (1) (1) selects min. days off; (L) (L) (H) (H) selects a specific range of days off between an indicated low and an indicated high. (D1) (D2) selects max. paired days off, where (D1) and (D2) are the indicated days (e.g., (6), (7) selects max. weekends off). A single digit (D1) selects max. specific days off. For example, a complete entry of (2) (3) (#) would select Category 2, maximum Wednesday'off.

For Category 3 ("Layovers"), the first three digits following the category code constitutes an airport code. For the following two digits, (0) (0) selects no layover time in the selected airport; (1) (1) selects min. layover time in the selected airport; (5) (5) selects any layover occurrence; (8) (8) selects max. layover occurrences at the selected airport; (9) (9) selects max. layover time at selected terminal. (*) (*) calls for the system to reprocess this category omitting "no layover" codes, if inadequate number of lines have been found acceptable.

In Category 4 ("Number of Trips"), (9) (9) selects the max. number of trips; (1) (1)) selects min. number of trips; (L) (L) (H) (H) selects a specific range of trips. An optional third digit (n) indicates the maximum number of days between an arrival and the next departure for it to be regarded as a single trip.

In Category 5 ("Productivity"), (9) (9) selects max. productivity; (1) (1) selects min. productivity. "Productivity", for this selection category, refers to the ratio of flying hours to hours away from base.

For Category 6 ("Airport Arrivals/Departures and Times"), the first digit entered after category selection relates to either departing flights (1) or arriving flights (2). The next three digits may be an airport code, followed by a (0), to omit, or by a (9) to require. Alternatively, the subscriber may enter four digits (L) (L) (H) (H), to designate a range of hours, followed by a (0), to omit, or a (9), to require. For example, an entry of (6) (1) (0) (7) (1) (2) (9) (#) requires departures between 7 am and 12 noon.

As will be understood, the number of preference selections to be entered into the system is not limited by the number of preference categories, but only by the design of the software. For example, the system may accommodate more than one selection from a given category.

It is contemplated in the system of the invention that a subscriber's preference selection may be changed regularly, at the option of the subscriber. Moreover, it is further contemplated that the subscriber may enter a default record of preference selections, which is available to the system at all times. In a given period, if the subscriber has not entered a current record of preference selections, the system automatically will refer to the default record for processing purposes. Accordingly, to the extent that the subscriber preferences do not change frequently, the periodic (i.e., monthly) processing of the subscriber preferences will take place automatically, without any input on the part of the subscriber.

Figures 3A, 3B:
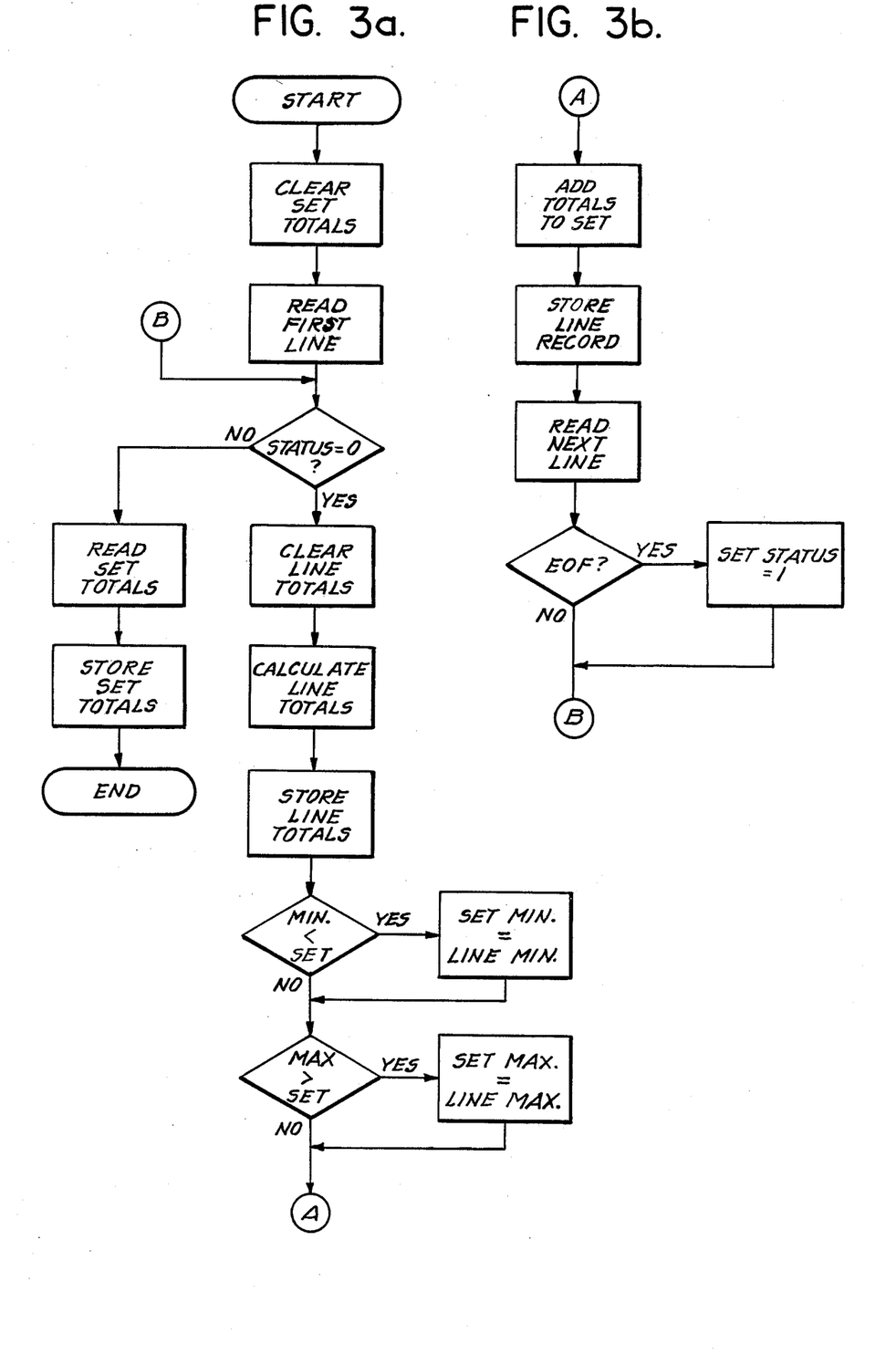
FIGS. 3a and 3b, together, constitute a simplified flow diagram illustrating procedures for preliminary processing of airline bid data, in order to set up the relevant information in a form appropriate for subsequent processing in conjunction with subscriber preference selections.

When the airline bid information is made available, it is entered into the system, either by direct downloading from the airline computer where practicable, or by manual entry of the published information. In either case, the airline data is processed first, to put it in a form compatible with the intended analysis procedures. A simplified flow sheet, representative of this preliminary processing of flight data, is illustrated in FIGS. 3a and 3b.

At the beginning of flight data processing, all set totals for a given set of flight data (e.g., bid lines issued by PanAm for 747 flights for the month) are cleared and initialized. "Max." values at set to zero and "Min." values are set at 9999 for the set. The system then proceeds to the processing loop, where the first test is for the key set by the end of file marker. Assuming the end of file has not been reached, the computer initializes the current data line, setting "max." values for the line to zero and "min." values for the line to 9999. The flight data for the current line is then read, and the information therefrom is imparted to the current data line for the particular set. For example, for Category 1, data entries will be made for the number of pay credit hours and carry forwards. The pay credit hours are then compared to stored values of "max." and "min." for the particular set. For the very first bid line analyzed, the pay credit hours will of course be greater than the initialized maximum and less than the initialized minimum. Accordingly, the pay credit hours for the first line will, temporarily, become both the "max." and "min." hours for the set. Of course, as subsequent, bid lines are read, if the credit hours are greater than the previously established "max.", the new value will replace the old, and likewise, with respect to "min." values. Accordingly, after all of the lines of the set have been analyzed, the "max." and "min." values stored for the set will be reflected in a separate data record for the set as a whole, which is in addition to the individual data records for the individual lines of flight information.

Similar analysis is carried out for each of the relevant categories. For example, for the "days off" category, for each line of information, the number of days off is recorded, the number of Mondays, Tuesdays, etc., the number of days off in a row is recorded as is the number of paired days off. For each line, these individual values are compared with previously established "max." and "min." values for the set, and then the values are added, to maintain a total for the set, for each of the categories and sub-categories. Each such element of information is stored in an ordered manner in a line record, and saved in the database.

When the test for end of bid line data is true, a status key is toggled. When the system next returns to the beginning of the loop, the status key signals the end of processing, and causes the system to save to the database the various totals and max/min values for the set. The flight bid line information is now ready to be processed against individual subscriber preference selection data in order to develop bid line selections for the subscriber.

Figures 4A, 4B:
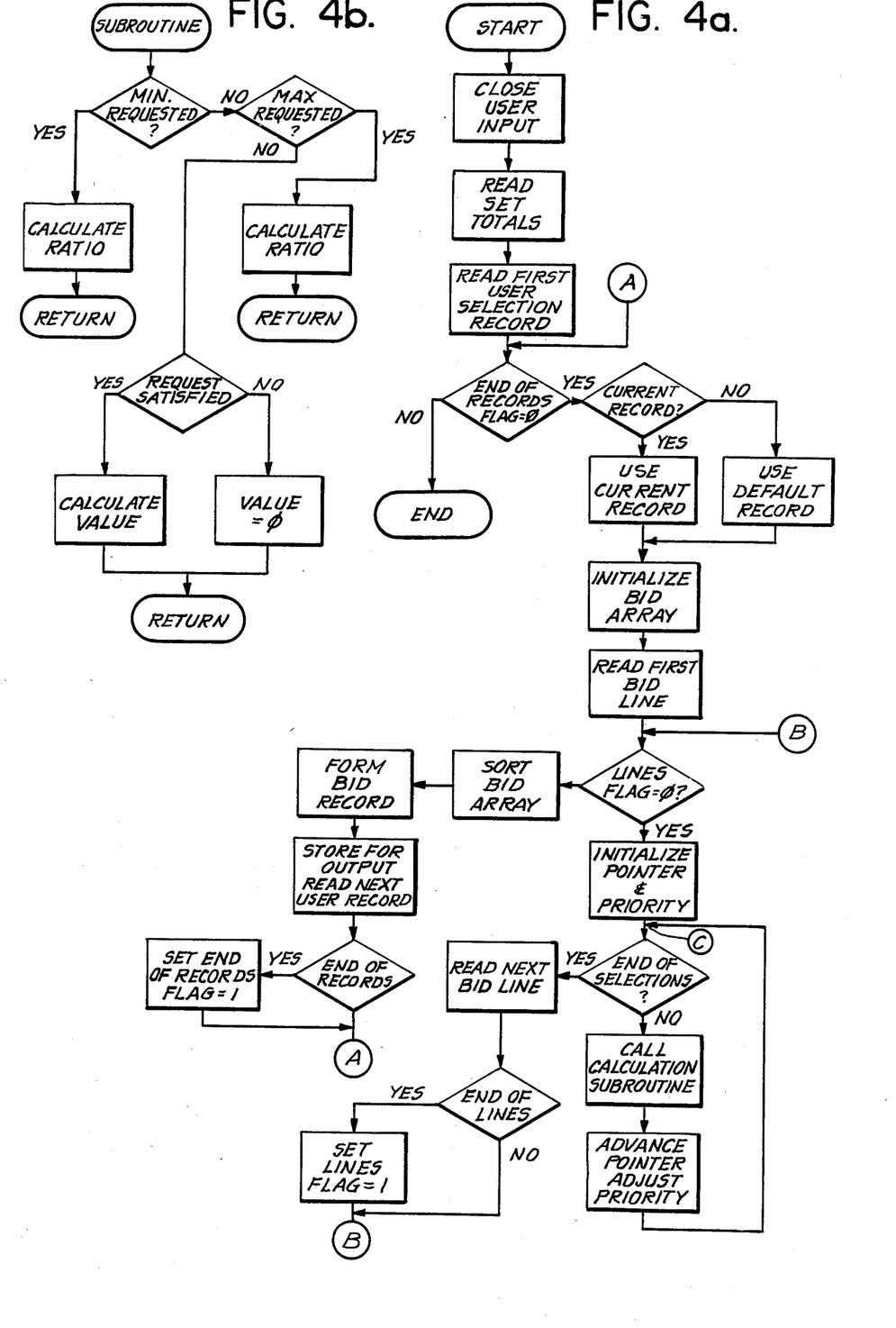
FIGS. 4a and 4b, together, constitute a simplified flow diagram illustrating the processing of subscriber preference information in conjunction with the preprocessed bid line information, and the identification of an ordered set of bid lines consistent with subscriber preferences and priorities.

The processing of subscriber preference selections with the relevant flight data is carried out according to a procedure reflected in the flow diagrams of FIGS. 4a and 4b.

To commence the final processing, a particular set of bid lines is chosen, for example, the bid lines for PanAm 747 flights for the month. In conjunction with that particular set of bid lines, the system will read subscriber preference selection records from those subscribers whose user class is consistent with PanAm 747 flights.

The first step, entering the processing loop in FIG. 4a, is to examine for the end of data status key for user selection records. Assuming that the end of data has not been reached, the system will examine for a current preference selection record for the subscriber. If such exists, its data will be utilized. If not, the system will retrieve the subscriber's default record and derive the preference data from that record.

As a preliminary step, the bid array record for the subscriber is initialized, to eliminate values entered from previous processing. Thereafter, the preprocessed bid lines are read, one by one, and each such bid line is compared against all of the preference selections made by the subscriber.

For processing of individual bid lines of flight data, the system enters a secondary loop, at the entry point "B" in FIG. 4a, where the data is tested for an "end of file" flag for the bid line file. If the key is not set, the system sets a pointer to the beginning of the subscriber preference selection data record. The bid line selection value, used later in determining the relative desirability of that particular bid line, is initialized (e.g., at zero).

After initialization of the bid line data, the preference selection data pointer is examined to determine if all of the data has been evaluated. If not, a selection value calculation subroutine is called. The pointer value is passed to the subroutine, along with the value of the priority adjustment variable. The latter, in the illustrated system, is derived from the order of selection by the subscriber. By way of example only, the first category selected may have a priority adjustment value of 100, the second 95, and so on. Then subroutine, shown in FIG. 4b, will be discussed later on. For the purposes of the present description, it is sufficient to note that the selection value subroutine determines a relative point value for the particular subcategory of data for the particular bid line. This calculated value is adjusted by the subscriber-determined priority, and the adjusted value is returned to the main processing routine.

Upon return from the subroutine, the selection point value calculated by the subroutine is added to the accumulating selection value of the bid line. The pointer is advanced, and the system returns to the beginning of a tertiary loop indicated by the letter "C" in FIG. 4a.

When all of the subscriber preference selections have been processed, the "end of selections" position of the pointer will test true, and the system will be caused to read the next bid line record. If the next bid line record is the end-of-file, the "lines flag" for the secondary loop is set to 1. Otherwise it remains ∅. In either case, the system returns to the beginning of the secondary loop at the letter "B".

The above processing will continue for a given subscriber file until each of the relevant bid lines has been processed and evaluated. Eventually, the "lines" flag will test true, indicating the end of processing for the particular subscriber. Thereupon, the processed and evaluated bid line data is sorted, to provide a bid line selection array arranged in descending order of selection point value. In other words, the bid lines having the greatest cumulative selection point value will appear first in the bid line array. The sorted bid line array is utilized to establish an output record consisting of the subscriber identification together with a predetermined group of flight numbers, taken from the sorted array. The flight numbers thus will be arranged in descending order of their calculated consistency with the expressed preferences and priorities of the subscriber. This bid line array record is stored in the database for future reference and may at that time or subsequently be output in the form of a printed bid card. The output of the system may alternatively be put in a form for direct submission to the airline, either in the form of a printed submission or by electronic transmission of the subscriber record, or the information may be furnished to the subscriber for use by the subscriber in making final bid line selections.

After storage and/or outputting of the final bid line array record for the subscriber, the system test for "end of records" key 4 the relevant subscriber file (in the example, PanAm 747 crew). If the "end of records" has been reached, a status key is set to true. In either case, the system returns to the beginning of the primary loop at "A" in FIG. 4a, where processing is continued with respect to the next subscriber records, if there are more, or terminated if not.

In the value calculation subroutine of FIG. 4b, there is shown a useful, but rather simplified routine for calculation of selection value increments for a particular subcategory of preference data. Data referred to the subroutine includes the values requested by the preference category, and the pointer value (indicating whether the selection is a first priority, second priority, etc.). This data is first tested by the subroutine to determine if it is a request for minimum or maximum values for the category or subcategory. If either of the foregoing, it is divided by the previously established min or max value for the entire set to establish a ratio. This ratio is then adjusted by a value reflecting the value of the priority indicator. The adjusted value is returned to the processing loop and added to the accumulating total selection value for the particular bid line.

If the request is for neither a maximum nor a minimum value, then the line information is tested to see if it meets the selection request. If so, it is assigned a predetermined value, adjusted by the indicated priority and returned to the processing loop for addition to the accumulating value. If the line data does not satisfy the selection request, a value of zero is returned.

The system and procedure of the present invention represents a major advance in the processing of airline bid line data, to enable the employee bidding process to be enormously simplified and at the same time vastly improved. Heretofore, bid line selection by airline employees has been an enormously difficult and time consuming undertaking, because of the enormity of the data factors contained in the bid material published by the major airlines each month. Complicating this process is a tendency for the airlines to wait until the last possible moment before issuing the bid line information, in order to minimize any advantage that competitive airlines might seek to derive from analysis of the published data. As a result, there may be only a few days time for the employees to endeavor to analyze massive amounts of data and attempt to make intelligent bid line selection choices. To add further to these complications, the flight employees may very well be out of town on a flight sequence during the critical days in which the new flight data must be analyzed and responded to. The procedure of the invention entirely unburdens the employee from these very difficult and time consuming responsibilities, because the employee need not in fact ever see the published flight data. The employee simply enters, at a time and place of his choosing and convenience, his preferences, based upon pre-analyzed categories of flight data known to be of interest to flight employees. As and when the flight data is published, it can be processed entirely independently of the subscribing employee, according to his or her recently expressed preference and priorities.

Not only does the system and procedure of the invention greatly reduce the workload of the subscriber in bidding for attractive (to him or her) flight sequences, but the procedure also enables the bidding process to be carried out in a much more thorough and reasoned manner than is practical for an employee proceeding on a "manual" basis. Because of the enormity of the data contained the monthly bid line publications of major commercial airlines, it is next to impossible for an employee to make a meaningful total analysis of the data. More typically, semi-subjective selections are made from principal, high priority considerations, with little practical consideration being given for subcategories of lower level priority. For flight personnel of low seniority, whose flight line awards typically consist of the "left-overs" from higher seniority personnel selections, the lower priority categories may in the end, prove quite significant in the selection of flights awarded.

With the procedure of the present invention, the output of the procedure, which is in substance an ordered array of flight identification numbers, arranged according to the degree to which the flights tend to satisfy the subscriber preferences, may consist of a very substantial array, such as 25, 50 or 75 flight numbers, for example. A low seniority employee may thus be reasonably assured that the flights awarded will bear a definite relation to indicated preferences, even if the highest priority preferences may be largely preempted by high seniority employees.

The concept of submitting bid preference and priority selections, not only makes it possible for bid selections to be made independently of the subscriber, but also allows for the maintenance of default preference/priority records, which may be referred in the event of failure of the subscriber to submit current preference/- priority information. For most normal circumstances, a well conceived default selection record will serve the subscriber well most of the time. It may then be necessary for the subscriber to submit current preference information only where there are particular needs or desires to be met, such as critical days to be taken off, layover time at a particular destination, or the like.

Significantly, the system of the invention is adapted for the inputting of preference/priority selection via touch tone telephone. Accordingly, subscribers can input their selections 24 hours a day, from almost any location in the world. This is a particularly important consideration, as air line personnel; necessarily spend a great deal of time in transit and away from their normal residences. Nonetheless, the system of the invention is equally adaptable to input from conventional PCs and dumb terminals, where such equipment is conveniently available to the subscriber.

It should be understood, of course, that the specific forms of the invention herein illustrated and described are intended to be representative only, as certain changes may be made therein without departing from the clear teachings of the disclosure.

By way of example, the system and procedure of the invention may be used to great advantage in the processing of so-called open time. Open time represents flight scheduling of an airline which becomes available after publishing of the monthly bid lines and the assignment thereof to the flight personnel. Frequently, previously assigned flights will become available during the month, because of the unavailability of the personnel to whom the original assignment was made. In addition, new flight scheduling sometimes is made during the mid-month period, because of special circumstances, such as equipment availability, necessity of meeting competition, etc. The procedure of the invention enables the subscriber's preference record to be processed against the open time, as and when it becomes available, enabling a subscriber to bid for additional flights and/or to upgrade the flight assignments in relation to the indicated preferences.

Heretofore, bidding for open time by flight employees has been a very time consuming process. Typically, a daily or periodic recording is made setting forth the newly available open time and reciting all of the relevant data therefrom. Considerable time is required simply to listen to the recitations, and it may prove quite difficult to absorb the relevant data. Moreover, the lengthy recitation of data tends quickly to become out of date, as selected bid lines are assigned. As will be readily appreciated, the procedures of the invention reduce to a practical minimum, the time involvement of the subscriber in the process of bidding for open time.

The procedures of the invention are also readily applicable to the processing of bid swaps. Because of the fact that a great number of the flight assignments made by airlines are not of the employee's first choice selections, and because individual needs and desires may change with new circumstances, there exists a very active practice among airline employees of bid swapping. Indeed, there are established businesses in the brokering of bid lines. As can be readily appreciated, it is a rather time intensive and thus costly process. With the procedures of the invention, however, a subscriber having a particular bid line available for swapping can be quickly matched with subscribers having expressed preferences for a bid line of such characteristics, for example.

Although the procedures of the invention are especially adapted for and are uniquely advantageous in connection with the processing of bid line data for airline employees, it is contemplated that the procedures of the invention may have applicability in other areas. Accordingly, reference should be made to the following appended claims in determining the full scope of the invention.

I claim:

1. The process of deriving a schedule of proposed bid lines for bid line balloting by airline personnel, which comprises
    (a) providing a first computer-accessible database for the entry of individual records of subscriber flight criteria preferences in predetermined categories of bid line data,
    (b) providing a second computer-accessible database for the entry of periodic bid line data published by a commercial airline,
    (c) performing a data analysis of the bid line data of said second database on a bid line by bid line basis to evaluate the individual data of each of said bid lines against the individually expressed preferences of the predetermined categories of said first database, for each subscriber,
    (d) on the basis of said analysis, calculating a selection value for each of the bid lines generally representative of the degree to which each such bid line tends to satisfy the individual flight criteria preferences previously entered by the subscriber, and
    (e) outputting an ordered list of bid lines, comprising all or part of said entire database of bid line data of said second database, arranged in a progressive order of selection value.

2. The process of claim 1, further characterized by
    (a) inputting into said second databse, for each subscriber, data reflecting the priority assigned by the subscriber to each of said predetermined categories of flight criteria, and
    (b) in calculating the selection value for each bid line, adjusting the value assigned to each predetermined category of flight criteria by a factor representative of said subscriber-assigned priority.

3. The process of claim 2, further characterized by
    (a) subscriber flight preferences being entered into said database in some or all of said predetermined categories in a sequence of categories chosen by the subscriber, and
    (b) the relative priorities assigned to each such category by an individual subscriber being determined, at least in part, as a function of the order of entry of preferences.

4. The process of claim 1, further characterized by
    (a) providing a third computer-accessible database for the retention of individual subscriber records of default preferences in predetermined categories,
    (b) as part of the data analysis routine, determining whether, for a given subscriber, said first database contains a current record of preferences, and
    (c) using said default record for said data analysis routine unless a current record of preferences has been entered for said subscriber.

5. The process of claim 1, further characterized by
    (a) said data analysis including a preliminary analysis of bid line data of said second database to establish selected data for the entire database set, including set maximums and set minimums in selected categories and set totals in certain categories, and thereafter, (b) analyzing said bid line data on a line by line basis, including a comparison of line data with set max/min values and set totals, as part of the evaluation of said bid line data in relation to subscriber preference data.

6. The process of deriving a schedule of proposed bid lines for bid line balloting by airline personnel, which comprises (a) providing a first computer-accessible bid selection database for the entry of bid selection criteria, (b) providing a second computer-accessible database comprised of a schedule of bid lines published by an airline for a predetermined employee group, (c) entering into said bid selection database a plurality of bid selection preference and priority criteria for an airline crew member, (d) weighting each of said bid selection criteria according to the priority thereof determined by said crew member, (e) successively analyzing the bid lines of said second database according to the weighted selection criteria of said bid selection database, and (f) outputting an ordered schedule of bid lines according to their tendency to satisfy said weighted selection criteria.

7. The process of claim 6, further characterized by (a) the procedure of entering said bid selection criteria into said bid selection database being carried out by the reception of remote telephone signals, (b) said remote telephone signals comprising touch tone signals, (c) converting said signals to computer-readable form, (d) individual inputs of said bid selection criteria comprising individual predetermined combinations of said touch tone signals.

8. The process of claim 7, further characterized by (a) said individual bid selection criteria being input into said first database in user determined sequence, (b) said individual selection criteria being priority weighted in accordance with the order of input by the user.

9. The process of deriving a schedule of proposed bid lines for bid line balloting by airline crews, which comprises (a) receiving from individual airline crew members, bid line selection criteria, in predetermined categories, in the form of coded signals from a remote terminal, (b) converting said signals to coded inputs of a form readable by a host computer, (c) providing a first computer-accessible database, (d) entering said coded inputs into individualized bid criteria records of said first database maintained for each said crew member, (e) entering into a second computer-accessible database the bid lines published by an airline for a predetermined scheduling period, (f) for each such crew member record, analyzing the published bid lines of said second database successively against the criteria of said individualized records and selecting from said second database an ordered schedule of a predetermined number of bid lines most closely meeting the bid line selection criteria of each such crew member record, and (g) providing an output comprising said ordered schedules.

10. The process of claim 9, further characterized by (a) individually weighting each of several bid selection criteria by a subscribing crew member, according to weighting selections determined by said crew member.

11. The process of claim 9, further characterized by (a) said output being in the form of a printed schedule of bid line selections, individualized according to the preferences of each subscribing crew member.

12. The process of claim 9, further characterized by (a) said coded signals being input by subscribing crew members using touch tone telephone equipment, (b) providing a further data base of verbal response data capable of being converted to audible words for transmission to a remote telephone source of coded input, (c) selecting individual data from the verbal response data base corresponding to the touch tone codes being input from said remote source, and (d) upon completion of predetermined sequences of coded touch tone input, activating the selected data from said verbal response database for transmission back to said remote source of a verbal confirmation of said coded touch tone input.

13. The method of processing a series of proposed subscriber selections of airline bid lines which comprises (a) receiving from individual subscribers selection criteria, in predetermined categories, in the form of coded signals from a remote terminal, (b) converting said signals to coded inputs of a form readable by a host computer, (c) providing a first computer-accessible database, (d) entering said coded inputs into individualized selection criteria records of said first database for each said subscriber, (e) entering into a second computer-accessible database the bid line selection data periodically published by an airline supplier, (f) for each such subscriber record, analyzing the published selection data of said second database successively against the criteria of said individualized selection criteria records and selecting from said second database an ordered schedule of selections most closely meeting the selection criteria of each such subscriber, and (g) utilizing the database of individualized selection criteria records of a plurality of subscribers for bid line swapping among subscribers.

14. The process of claim 13, further characterized by (a) individually weighting each of several selection criteria by a subscriber, according to weighting selections determined by said subscriber.

15. The method of claim 13, further characterized by (a) said bid line swapping comprising matching bid lines of one subscriber against indicated preferences of a second subscriber.

16. The process of deriving a schedule of proposed subscriber selections which comprises (a) receiving from individual subscribers selection criteria, in predetermined categories, in the form of coded signals from a remote terminal, (b) converting said signals to coded inputs of a form readable by a host computer, (c) providing a first computer-accessible database, (d) entering said coded inputs into individualized selection criteria records of said first database for each said subscriber,
(e) entering into a second computer-accessible database the selection data periodically published by a supplier,
(f) for each such subscriber record, analyzing the published selection data of said second database successively against the criteria of said individualized selection criteria records and selecting from said second database an ordered schedule of selections most closely meeting the selection criteria of each such subscriber,
(g) providing an output comprising said ordered schedule,
(h) said supplier being an airline company, and
(i) said selection data comprising bid line data as periodically published by said airline company.

* * * * *